(12) United States Patent
Roy et al.

(10) Patent No.: US 7,957,277 B2
(45) Date of Patent: Jun. 7, 2011

(54) WIRELESS COMMUNICATION METHOD AND SYSTEM FOR ROUTING PACKETS VIA INTRA-MESH AND EXTRA-MESH ROUTES

(75) Inventors: Vincent Roy, Montreal (CA); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 542 days.

(21) Appl. No.: 11/257,560

(22) Filed: Oct. 25, 2005

(65) Prior Publication Data
US 2006/0193285 A1  Aug. 31, 2006

Related U.S. Application Data

(60) Provisional application No. 60/656,303, filed on Feb. 25, 2005.

(51) Int. Cl.
*G01R 31/08* (2006.01)
*G06F 11/00* (2006.01)
*H04L 12/28* (2006.01)
*H04L 12/56* (2006.01)

(52) U.S. Cl. .............. 370/230; 370/248; 370/395.21; 370/406

(58) Field of Classification Search .......... 370/230, 370/235, 351, 401, 406, 247, 248, 449
See application file for complete search history.

(56) References Cited

U.S. PATENT DOCUMENTS
5,781,534 A   7/1998   Perlman et al.
6,307,843 B1  10/2001  Okanoue
(Continued)

FOREIGN PATENT DOCUMENTS
EP   0 999 717   5/2000
(Continued)

OTHER PUBLICATIONS

IEEE Wireless LAN Edition—A compilation based on IEEE Std. 802.11™—1999 (R2003) and its amendments, Sep. 19, 2003.

(Continued)

*Primary Examiner* — Chirag G Shah
*Assistant Examiner* — Ashley L Shivers
(74) *Attorney, Agent, or Firm* — Volpe and Koenig, P.C.

(57) ABSTRACT

A wireless communication system including a mesh network having a plurality of mesh points (MPs), a plurality of wireless transmit/receive units (WTRUs), extra-mesh local area network (LAN) resources, and an external network is disclosed. When one of the MPs receives a packet, a determination is made as to whether the received packet is destined to another MP belonging to the same mesh network, (or to a WTRU served by another MP), and, if so, a determination is made as to whether there are at least two mesh portals in the mesh network that provide access to the external network via the extra-mesh LAN resources. The packet is routed according to an intra-mesh routing algorithm if there are less than two mesh portals in the mesh network. Otherwise, a determination is made as to whether an extra-mesh routing algorithm or an intra-mesh routing algorithm should be used.

18 Claims, 3 Drawing Sheets

U.S. PATENT DOCUMENTS

| | | | |
|---|---|---|---|
| 6,954,435 B2 | 10/2005 | Billhartz et al. | |
| 6,977,938 B2 | 12/2005 | Alriksson et al. | |
| 7,295,806 B2 | 11/2007 | Corbett et al. | |
| 7,586,894 B2 * | 9/2009 | Aoki et al. | 370/349 |
| 2004/0190454 A1 | 9/2004 | Higasiyama | |
| 2004/0790454 | 9/2004 | Higasiyama | |
| 2004/0246975 A1 | 12/2004 | Joshi | |
| 2005/0122955 A1 | 6/2005 | Lin et al. | |
| 2006/0031576 A1 | 2/2006 | Canright | |
| 2006/0109815 A1 * | 5/2006 | Ozer et al. | 370/329 |
| 2006/0125703 A1 * | 6/2006 | Ma et al. | 343/767 |
| 2006/0146718 A1 | 7/2006 | Yarvis et al. | |
| 2006/0146846 A1 * | 7/2006 | Yarvis et al. | 370/406 |
| 2009/0310488 A1 * | 12/2009 | Mighani et al. | 370/235 |

FOREIGN PATENT DOCUMENTS

JP    2004-201140    7/2004

OTHER PUBLICATIONS

Raniwala et al., "Evaluation of a Wireless Enterprise Backbone Network Architecture," $12^{th}$ Annual IEEE Symposium on High Performance Interconnects, pp. 98-104 (Aug. 2004).

Takasugi et al., "Technology for Service Continuity Adapting to Dynamic Environment Seamlessly," IPSJ Journal, vol. 46, No. 2, pp. 608-623 (Feb. 2005).

* cited by examiner

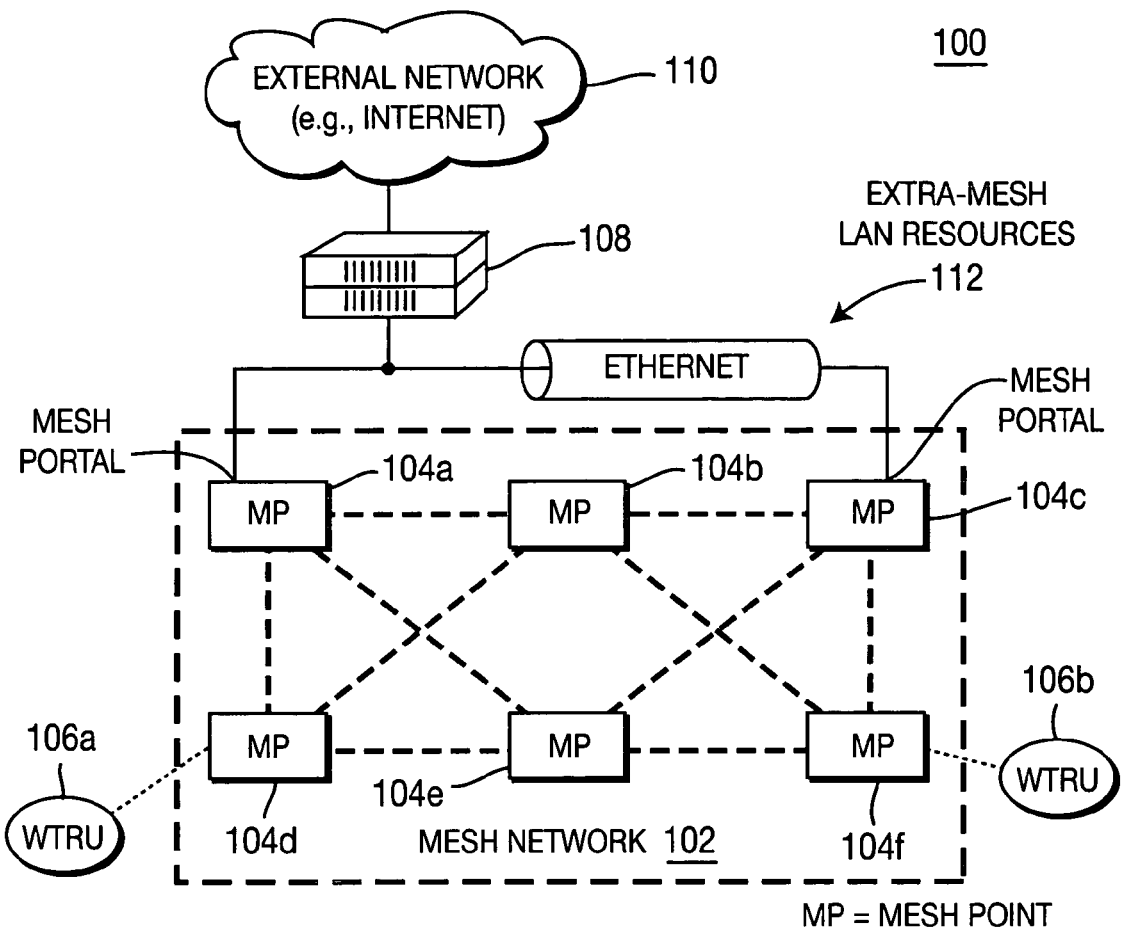
FIG. 1
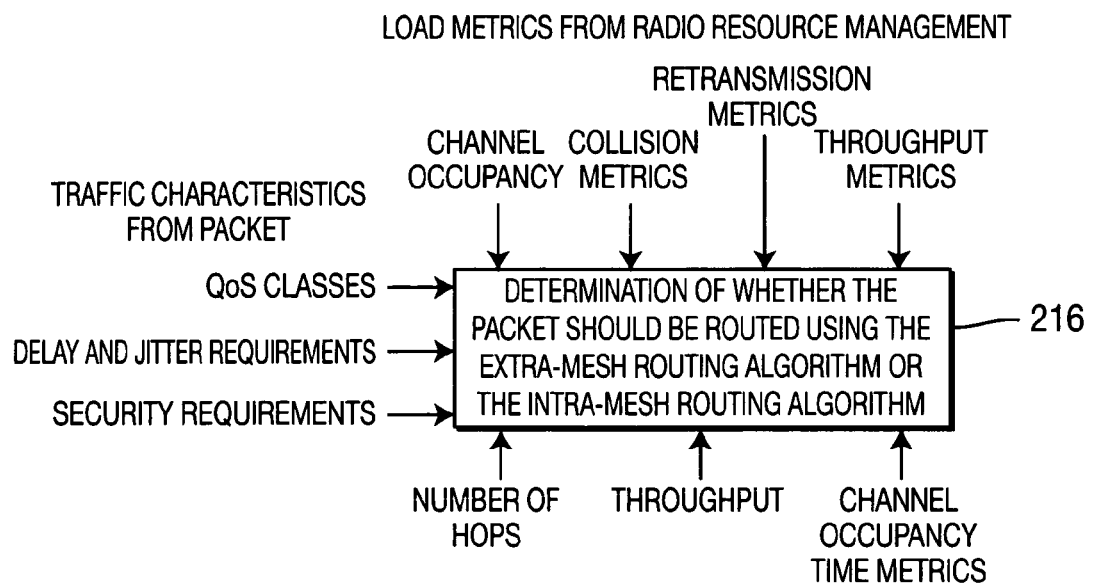
FIG. 3 ROUTE METRICS FROM PROBING PROCEDURE
(ALLOWS COMPARISON OF INTRA-MESH ROUTING AND EXTRA-MESH ROUTING)

WIRELESS COMMUNICATION METHOD AND SYSTEM FOR ROUTING PACKETS VIA INTRA-MESH AND EXTRA-MESH ROUTES

CROSS REFERENCE TO RELATED APPLICATION

This application claims the benefit of U.S. provisional application No. 60/656,303 filed Feb. 25, 2005, which is incorporated by reference as if fully set forth.

FIELD OF INVENTION

The present invention is related to a wireless communication system including a mesh network and an external network. More particularly, the present invention is related to routing packets via intra-mesh and extra-mesh routes.

BACKGROUND

A wireless communication system typically includes a plurality of access points (APs), (i.e., base stations) which are connected to each other through a wired network, (i.e., a backhaul network). In some cases, directly connecting a given AP to the wired network is more desirable than indirectly connecting the AP to the wired network by relaying a data packet to and from neighboring APs, such as in a mesh network.

A mesh wireless local area network (WLAN), (i.e., mesh network), includes a plurality of mesh points (MPs), each of which is connected to one or more neighboring MPs with wireless links such that a data packet may be routed using the intra-mesh radio resources via one or more hops to a destination. The mesh network has an advantage of ease and speed of deployment because radio links between MPs can be deployed without having to provide a backhaul wired network for each AP.

A mesh network usually belongs to a bigger local area network (LAN) which can include different types of LAN technologies, (e.g., IEEE 802.3 Ethernet, IEEE 802.5 Token Ring, IEEE 802.11 WLAN, or the like). A mesh portal is an MP that provides interconnectivity between the mesh network and the rest of the LAN. The LAN resources that do not belong to the mesh network are referred to as extra-mesh LAN resources. A mesh network having two or more mesh portals is a multi-portal mesh network. In a multi-portal mesh network, the portals could be interconnected via the extra-mesh LAN resources.

Two types of traffic exist in a mesh network: Intra-mesh traffic that is destined to nodes within the mesh network, and extra-mesh traffic that is destined to nodes lying outside of the mesh network. A mesh network that does not have a mesh portal can only support intra-mesh traffic, since with no mesh portal there is no way for the packet to be forwarded outside of the mesh. On the other hand, a mesh network with one or more mesh portals can support both intra-mesh traffic and extra-mesh traffic.

Routing intra-mesh traffic is referred to as intra-mesh routing and consists of determining the best path between any two MPs of the mesh network throughout the mesh. Similarly, routing extra-mesh traffic is referred to as extra-mesh routing and consists of determining the best path between any MP and its best, (e.g., closest), mesh portal.

Although a mesh network is advantageous in terms of its ease of deployment and low cost of establishing a backhaul network, the radio resource capacity of the mesh network is limited. Since the mesh network can use multiple hops between MPs to relay a packet from one node to another, a large portion of the channel capacity is used to support the wireless backhaul. Thus, the capacity of the mesh network decreases exponentially as the number of hops that the packets need to reach their destination increases.

SUMMARY

The present invention is a wireless communication system including a mesh network having a plurality of MPs, a plurality of wireless transmit/receive units (WTRUs), extra-mesh LAN resources, and an external network. When one of the MPs of the mesh network receives a packet, a determination is made as to whether the received packet is destined to another MP belonging to the same mesh network, (or to a WTRU served by another MP), and, if so, a determination is made as to whether there are at least two mesh portals in the mesh network that provide access to the external network via the extra-mesh LAN resources. The packet is routed according to an intra-mesh routing algorithm if there are less than two mesh portals in the mesh network. Otherwise, a determination is made as to whether an extra-mesh routing algorithm or an intra-mesh routing algorithm should be used.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 1 shows an exemplary wireless communication system including a mesh network with two mesh portals in accordance with the present invention;

FIG. 3 shows exemplary inputs for determining in the process of FIG. 2 whether packets should be routed using an extra-mesh routing algorithm or an intra-mesh routing algorithm;

DETAILED DESCRIPTION OF THE PREFERRED EMBODIMENTS

Figure 2:
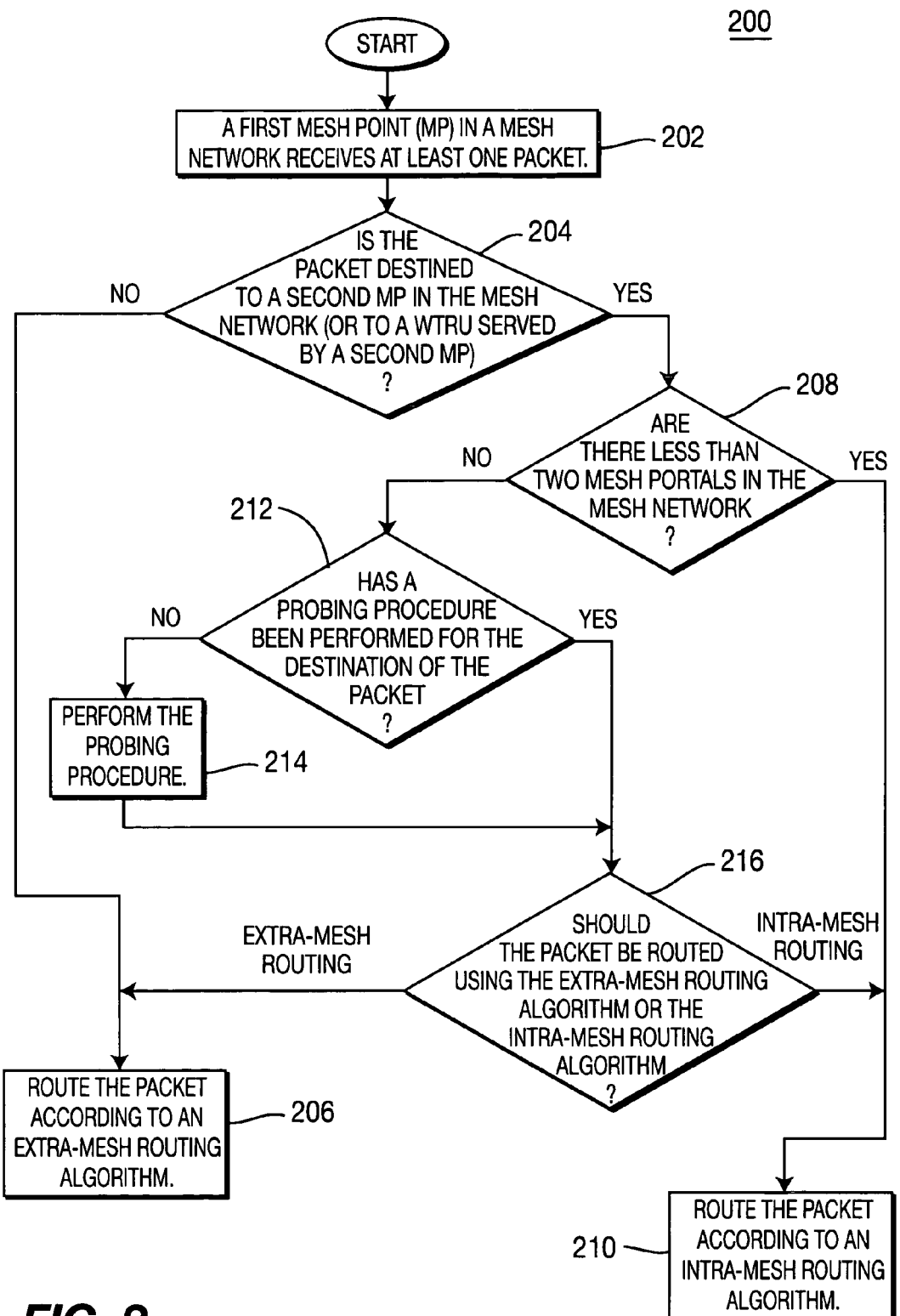
FIG. 2 is a flow diagram of a process including method steps for managing intra-mesh and extra-mesh radio resources jointly in accordance with the present invention.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "MP" includes but is not limited to a base station, a Node-B, a site controller, a wireless station, an AP or any other type of interfacing device used in a wireless environment.

The features of the present invention may be incorporated into an integrated circuit (IC) or be configured in a circuit comprising a multitude of interconnecting components.

FIG. 1 shows an exemplary wireless communication system 100 in accordance with the present invention. The wireless communication system 100 includes a mesh network 102 having a plurality of MPs 104a-104f, a plurality of WTRUs 106a, 106b, a router 108 and an external network 110, (e.g., a wide area network (WAN) such as the Internet).

In the example of FIG. 1, two of the MPs 104 in the mesh network 102 are mesh portals 104a and 104c. The mesh portals 104a and 104c are connected to extra-mesh LAN resources 112, (such as Ethernet), to enable access to the network 110 via the router 108 such that a data packet may be forwarded through the extra-mesh LAN resources 112 between the mesh portals 104a and 104c. For example, if the MP 104d needs to send a packet to MP 104c, the packet would normally be routed through either MP 104b or MP 104e, which will then forward it to 104c. In accordance with the present invention, the packet may be forwarded to MP 104c via MP 104a and the extra-mesh wired LAN resources 112. Thus, the radio resources of the mesh are relieved by capitalizing on the wired link between the two mesh portals 104a and 104c.

Although FIG. 1 illustrates six MPs 104 and two WTRUs 106 as an example, more or less MPs 104 may be implemented, and more or less WTRUs 106 may exist in the wireless communication system 100. Each of the MPs 104a-104f is connected to at least one neighboring MP 104 such that a data packet sent from a source, such as the WTRU 106a, may be forwarded through the mesh network 102 to a destination, such as the WTRU 106b, via one or more hops.

FIG. 2 is a flow diagram of a process 200 including method steps for managing intra-mesh and extra-mesh radio resources jointly in accordance with the present invention. When a first one of the MPs 104 in the mesh network 102 receives at least one packet (step 202), the MP 104 determines whether the packet is destined to a second MP 104 in the mesh network 102 or to a WTRU 106a, 106b being served by the second MP 104 (step 204).

If it is determined at step 204 that the packet is not destined to a second MP 104 in the mesh network 102 or to one of the WTRUs 106a, 106b, the packet is routed according to an extra-mesh routing algorithm (step 206). For example, the extra-mesh routing may be used to facilitate web-browsing, (i.e., communicating with a server external to the mesh network 102, such as the network 110 of FIG. 1).

If it is determined at step 204 that the packet is destined to a second MP in the mesh network 102 or to one of the WTRUs 106a, 106b, it is further determined at step 208 whether or not there are less than two (2) mesh portals in the mesh network 100. The number of mesh portals can be determined when setting up the mesh network 102, accessing a configuration parameter database or the like. If there are less than two (2) mesh portals in the mesh network 102, the packet is routed according to an intra-mesh routing algorithm (step 210). If there are at least two (2) mesh portals in the mesh network 102, it is determined whether a probing procedure has been performed for the destination of the packet (step 212). The probing procedure is performed such that the first MP 104 may obtain necessary metrics for the specific destination indicated by the packet header to be able to decide whether the packet should be routed using intra-mesh resources or extra-mesh resources.

If it is determined at step 212 that a probing procedure has not been performed and therefore the necessary metrics are not available, a probing procedure is performed at step 214.

If it is determined at step 212 that a probing procedure has been performed for the destination of the packet and therefore the necessary metrics are already available, or after the necessary metrics are obtained by performing the probing procedure at step 214, it is further determined at step 216 whether the packet should be routed using the extra-mesh routing algorithm at step 206 or the intra-mesh routing algorithm at step 210.

FIG. 3 shows exemplary inputs for determining at step 216 of the process 200 of FIG. 2 whether packets should be routed using the extra-mesh routing algorithm or the intra-mesh routing algorithm. Criteria used to make the determination of step 216 include, but are not limited to, load metrics obtained from a radio resource management entity, traffic characteristics from the packet and route metrics obtained from the probing procedure. The load metrics include, but are not limited to, channel occupancy, a collision rate, a retransmission rate, throughput, or the like. The traffic characteristics include, but are not limited to, delay and jitter requirements of the packet, a quality of service (QoS) access class of the packet and security requirements. The route metrics include, but are not limited to, the number of hops, throughput and estimated channel occupancy time, (which can be estimated from the packet length and the throughput of each hop for each route). The route metrics allow comparison of intra-mesh routes and extra-mesh routes. The determination of which route to take is typically based on one or a combination of the metrics described above. For example, if the only metric of importance in a given implementation is the delay associated to a route, the route that would offer the smallest delay would be used to forward the packet to its destination.

Referring to FIG. 1, each MP 104, or alternatively a centralized controlling entity, determines what would be advantageous for the packet between intra-mesh routing and extra-mesh routing based on at least one of these inputs. Continuing with the previous example where MP 104d needs to send a packet to MP 104c, a preferred route is determined by comparing the delay associated with each possible route and selecting the route which offers the smallest delay. This is done using the delay metrics collected by the probing procedure illustrated in FIG. 4. In a typical mesh system, the potential routes would include MPs 104d-104b-104c, MPs 104d-104e-104c, MPs 104d-104e-104f-104c, or the like. In accordance with the present invention, all these routes are possible. However, routes that use the extra-mesh LAN resources may be considered. One example of such route is: MP 104d-104a-112-104c. Thus, a route, whether a pure intra-mesh route or one that capitalizes on the extra-mesh LAN resources 112, such as the route 104d-104a-112-104c, is selected based on which route offers the smallest delay.

Figure 4:
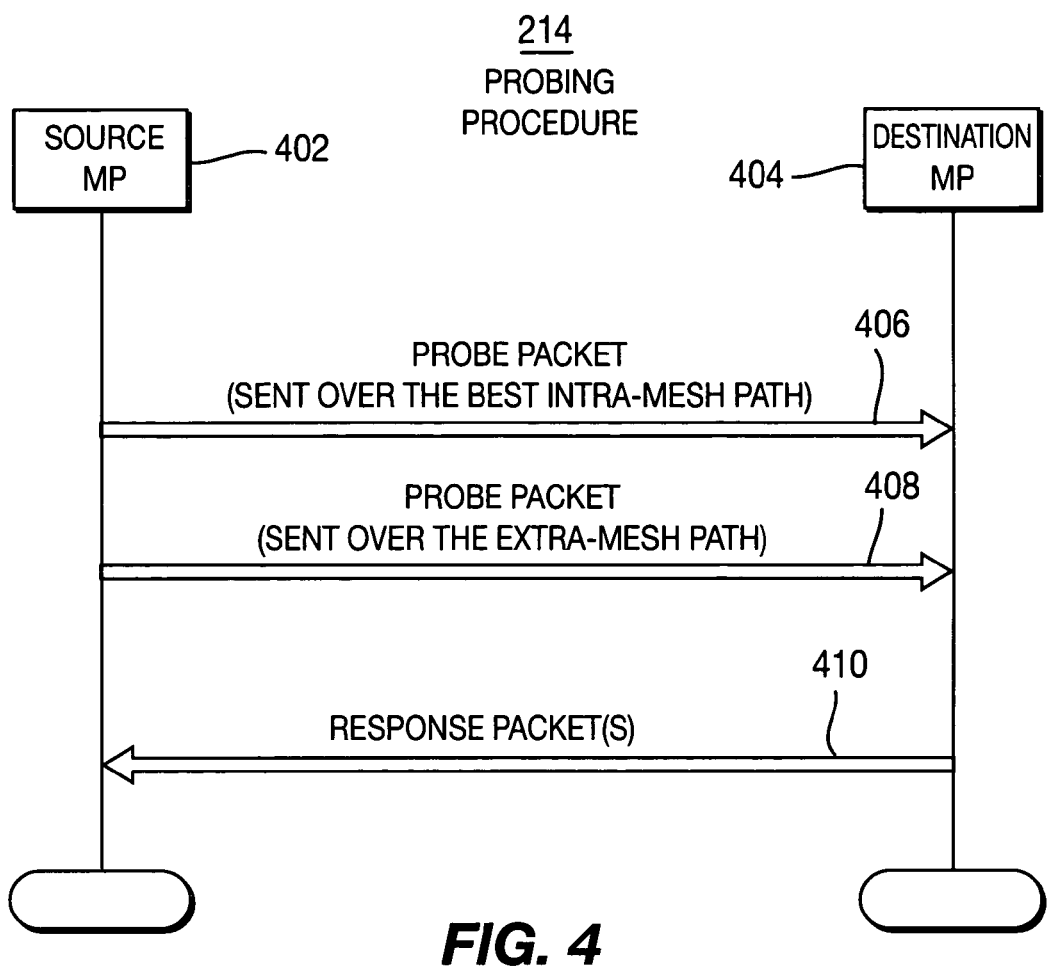
FIG. 4 is a signaling diagram for managing intra-mesh and extra-mesh radio resources jointly in accordance with the present invention.

FIG. 4 is a signaling diagram of a probing process performed in step 214 of the process 200 of FIG. 2 in accordance with the present invention. In the probing procedure 214, a set of probe packets are sent from a source MP 402 to a destination MP 404 over different paths that are to be measured. If the mesh network 102 routes the packet in a connectionless fashion, (i.e., a system where the route that a packet takes to go from the source node to the destination node is not predetermined and is the end-result of routing decisions taken at each intermediate node between the source node and the destination node), the probing procedure 214 is performed at each MP 104. If the packet is routed in a connection-oriented fashion, (i.e., a system where the route that a packet takes to go from the source node to the destination node is known prior to the packet leaving the source node), the probing needs to be performed only at the first MP, (i.e., the source MP 402).

As shown in FIG. 4, the source MP 402 uses a routing function, (i.e., algorithm), to send a first probe packet to a destination MP 404 over a "best" intra-mesh path 406, and also send a second probe packet over an extra-mesh path 408 via two mesh portals to the destination MP 404. After receiving both of the probe packets, the destination MP 404 compiles the statistics collected by the two probes packets over the routes 406 and 408, and the associated metrics, (e.g., number of hops, network delay, average throughput, or the like), to generate a consolidated response packet 410 which is sent from the destination MP 404 to the source MP 402. Alternatively, the destination MP 404 may generate individual response packets 410 for each of the probe packets it receives over the paths 406 and 408.

Upon reception of two response packets 410, the source MP 402 may compare the arrival time of the response packets 410. Alternatively, or in addition to, the MP 402 may compare the information included in each of the probe packets. The comparison may be based on information encapsulated inside the packets that has been updated by the nodes along the path, (e.g., number of hops).

For end-to-end delay measurements, a timestamp may be used. When the source MP 402 sends the probe packets, the source MP 402 stamps the probe packets with the transmission time. The destination MP 404 then receives the probe packet and stores the time marked in the probe packet as well as the local time at which the probe packet was received. The same process is repeated for all subsequent probe packets. Once all of the probe packets are received, the difference between the local time and the stamped time is calculated and a list is made with the paths, ordered by the difference value. Since the time is reported as a time difference, the source MP 402 and the destination MP 404 need not be fully synchronized.

Different measurements may be taken with the probing procedure 214. Information in the probe packet may include, but is not limited to, at least one of timestamp, number of expected probes, a maximum rate on path, a minimum rate on path, an average rate on path, number of hops within mesh and a load/congestion indicator. The information in the response packet may include, but is not limited to, at least one of timestamp, time difference between probe packets, number of received probe packets, a maximum rate on path, a minimum rate on path, an average rate on path, number of hops within mesh and a load/congestion indicator.

Even though the signaling of FIG. 4 is shown as a single-way process, (i.e., from the source MP 402 to the destination MP 404), the paths for the probe packet and the response packet may not be same. A similar process may be performed in order to make an evaluation of the return path. The process can be extended to a two-way process if responses are combined with new probe packets.

Figure 5:
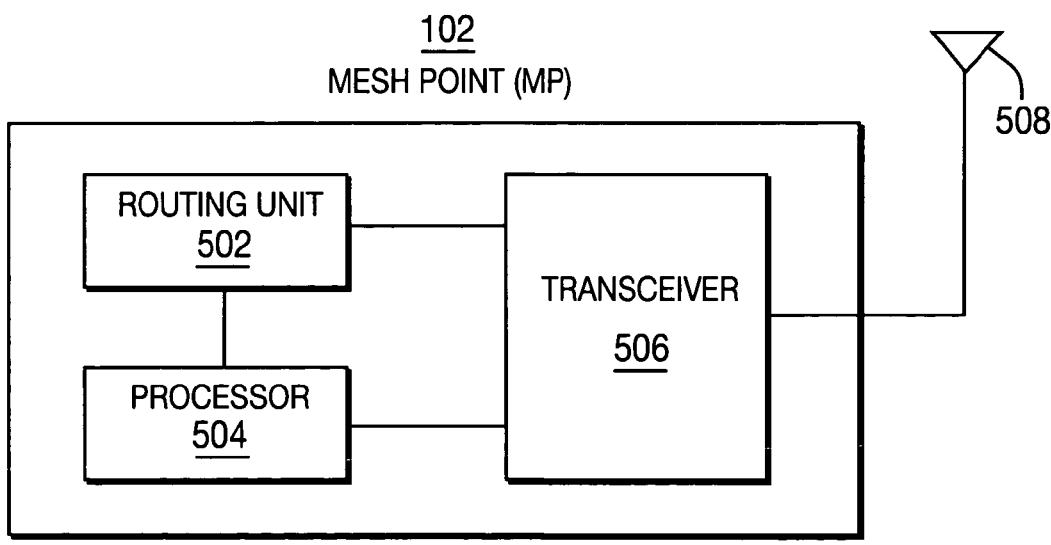
FIG. 5 is a block diagram of an MP in accordance with the present invention.

FIG. 5 is a block diagram of an MP 102 in accordance with the present invention. The MP 102 includes a routing unit 502, a processor 504, a transceiver 506 and an antenna 508. The routing unit 502 determines the best route in accordance with an intra-mesh routing algorithm or an extra-mesh routing algorithm for a given destination. The processor 504 determines whether the packet should be routed through only intra-mesh resources or through extra-mesh resources, as explained hereinabove. Packets are transmitted and received through the transceiver 506 and the antenna 508 in accordance with the routing unit 502 and the processor 504.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of routing a packet implemented by a mesh point (MP) of a wireless mesh network, the method comprising:

receiving a packet at the MP;
performing a probing procedure for a destination of the received packet on a condition that:
it has been determined that there are at least two mesh portals in the mesh network; and
the probing procedure for the destination of the received packet has not been previously performed;
determining whether to route the received packet using an extra-mesh routing procedure or an intra-mesh routing procedure based on route metrics obtained from the probing procedure; and
routing the received packet using the determined routing procedure.

2. The method of claim 1, further comprising: routing the received packet to an external network.

3. The method of claim 2 wherein the external network is the Internet.

4. The method of claim 1 further comprising:
generating a path metric, from a received probe response, to all active mesh portals in the wireless mesh network based on the received probe response.

5. A mesh point (MP) comprising:
a receiver configured to receive a packet;
a processor configured to determine, based on route metrics obtained from a probing procedure performed for a destination of the received packet, whether to route the received packet using an extra-mesh routing procedure or intra-mesh routing procedure, wherein the probing procedure for the destination of the packet is performed on a condition that it has been determined that there are at least two mesh portals in the mesh network and the probing procedure for the destination of the received packet has not been previously performed; and
a transmitter configured to route the received packet using the routing procedure determined by the processor.

6. The MP of claim 5 wherein the transmitter is further configured to route the received packet to an external network.

7. The MP of claim 6 wherein the external network is the Internet.

8. The MP of claim 5 wherein the processor is further configured to generate a path metric, from a received probe response, to all active mesh portals in the wireless mesh network based on the received probe response.

9. The method of claim 1 wherein the route determination is based on load metrics obtained from a radio resource management entity.

10. The method of claim 9 wherein the load metrics include at least one of channel occupancy, collision rate, retransmission rate and throughput.

11. The method of claim 1 wherein the route determination is based on traffic characteristics from the route metrics obtained from the probing procedure.

12. The method of claim 11 wherein the traffic characteristics include at least one of delay and jitter requirements of the received packet, a quality of service (QoS) access class of the received packet and security requirements.

13. The method of claim 11 wherein the route metrics include at least one of a number of hops, throughput and estimated channel occupancy time.

14. The MP of claim 5 wherein the route determination is based on load metrics obtained from a radio resource management entity.

15. The MP of claim 14 wherein the load metrics include at least one of channel occupancy, collision rate, retransmission rate and throughput.

16. The MP of claim 5 wherein the route determination is based on traffic characteristics from the route metrics obtained from the probing procedure.

17. The MP of claim 16 wherein the traffic characteristics include at least one of delay and jitter requirements of the received packet, a quality of service (QoS) access class of the received packet and security requirements.

18. The MP of claim 16 wherein the route metrics include at least one of a number of hops, throughput and estimated channel occupancy time.

* * * * *

UNITED STATES PATENT AND TRADEMARK OFFICE
CERTIFICATE OF CORRECTION

| | | |
|---|---|---|
| PATENT NO. | : 7,957,277 B2 | Page 1 of 1 |
| APPLICATION NO. | : 11/257560 | |
| DATED | : June 7, 2011 | |
| INVENTOR(S) | : Roy et al. | |

It is certified that error appears in the above-identified patent and that said Letters Patent is hereby corrected as shown below:

ON THE TITLE PAGE

Item (56) U.S. PATENT DOCUMENTS, page 2, after 2004/0190454 A1 9/2004 Higasiyama, delete "2004/0190454 9/2004 Higasiyama".

Item (56) U.S. PATENT DOCUMENTS, page 2, after "2006/0031576 A1 2/2006 Canright" delete "2006/0109815 A1 5/2006 Ozer et al. .....370/329".

Signed and Sealed this
Fourth Day of October, 2011

David J. Kappos
*Director of the United States Patent and Trademark Office*